Figure 1:
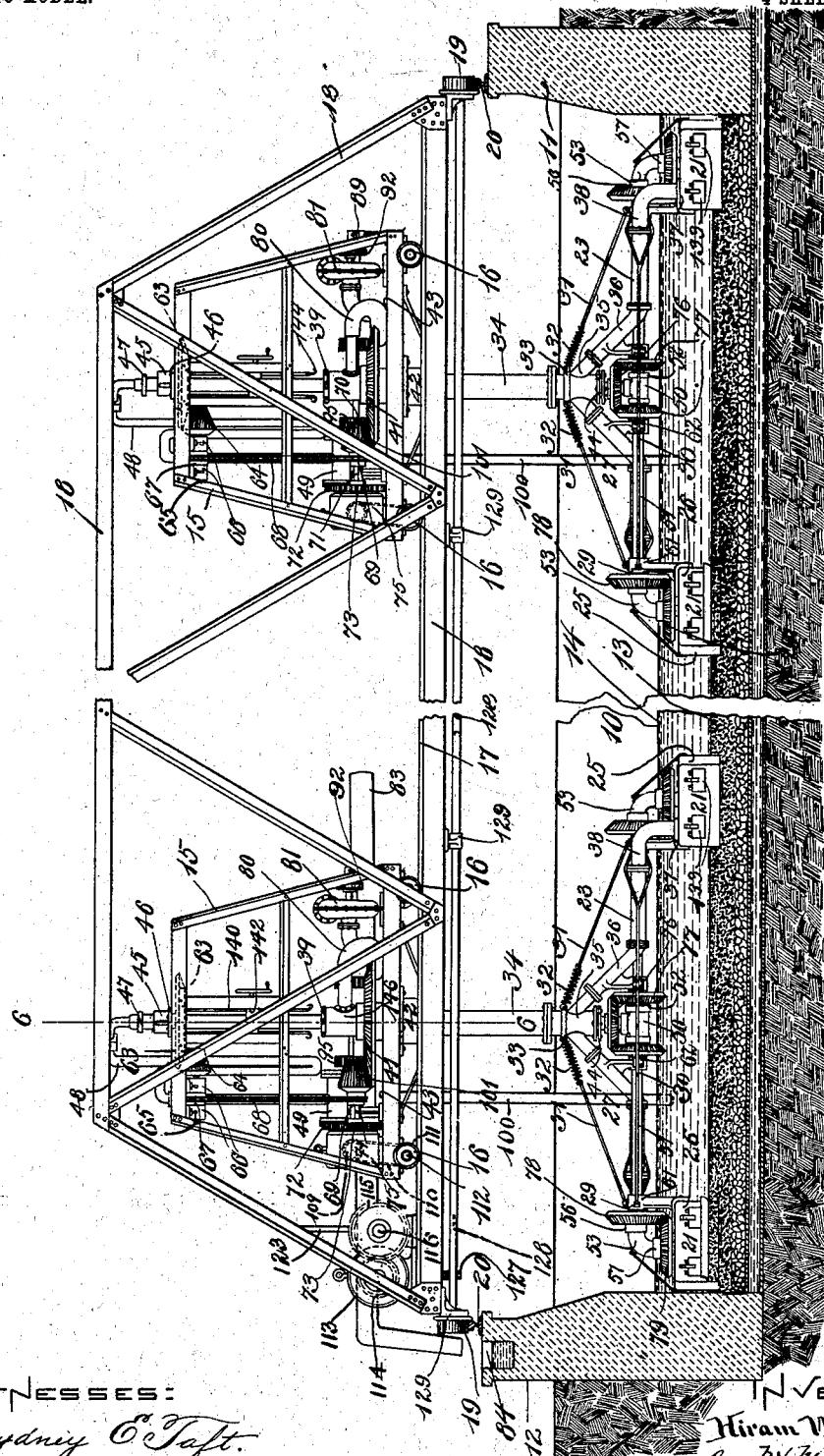

No. 729,720. PATENTED JUNE 2, 1903.
H. W. BLAISDELL.
APPARATUS FOR CLEANING SAND FILTER BEDS.
APPLICATION FILED MAY 3, 1902.
NO MODEL. 4 SHEETS—SHEET 1.

WITNESSES:
Sydney E. Taft.
William H. Forrest.

INVENTOR:
Hiram W. Blaisdell,
By his Attorney.
Charles S. Gooding.

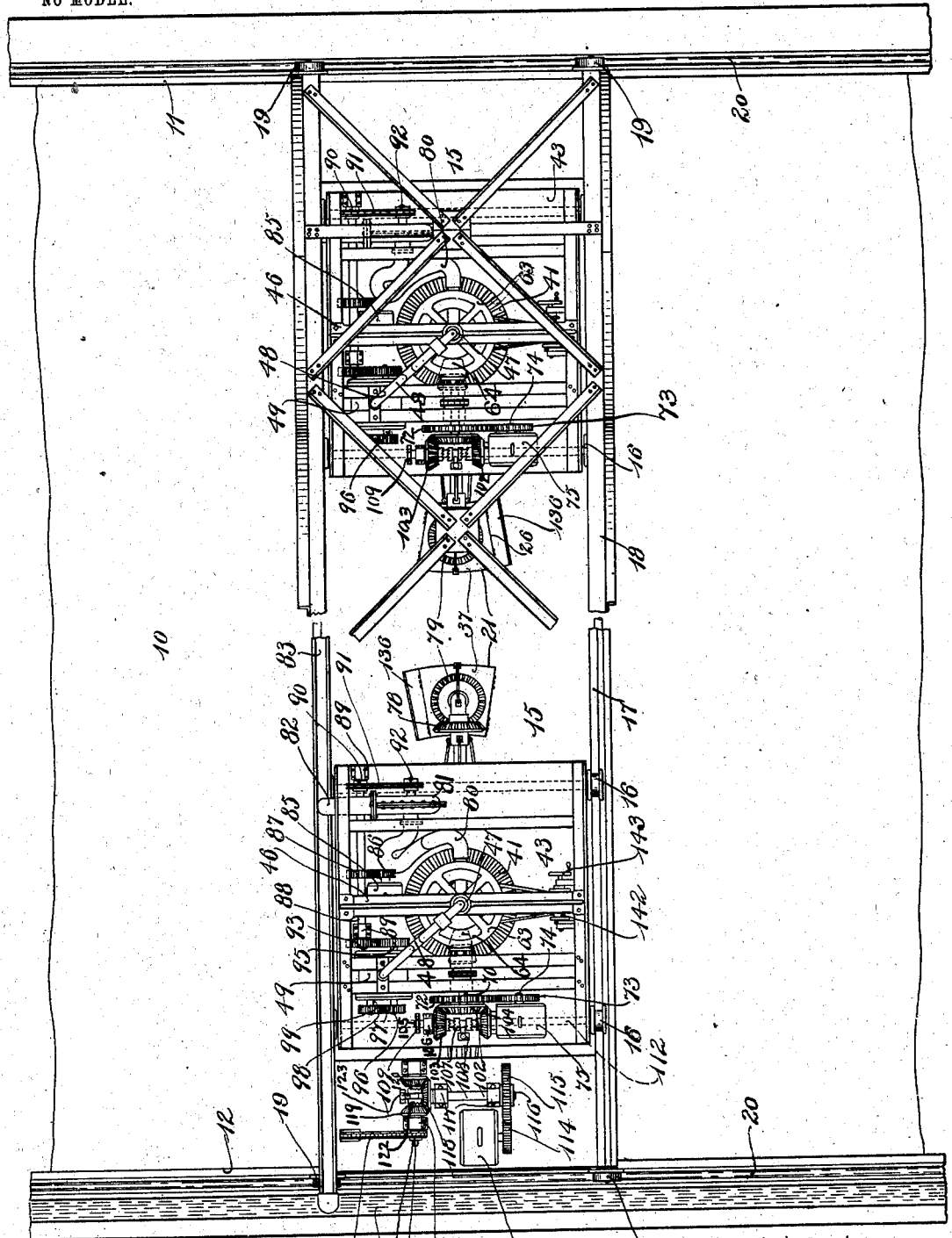

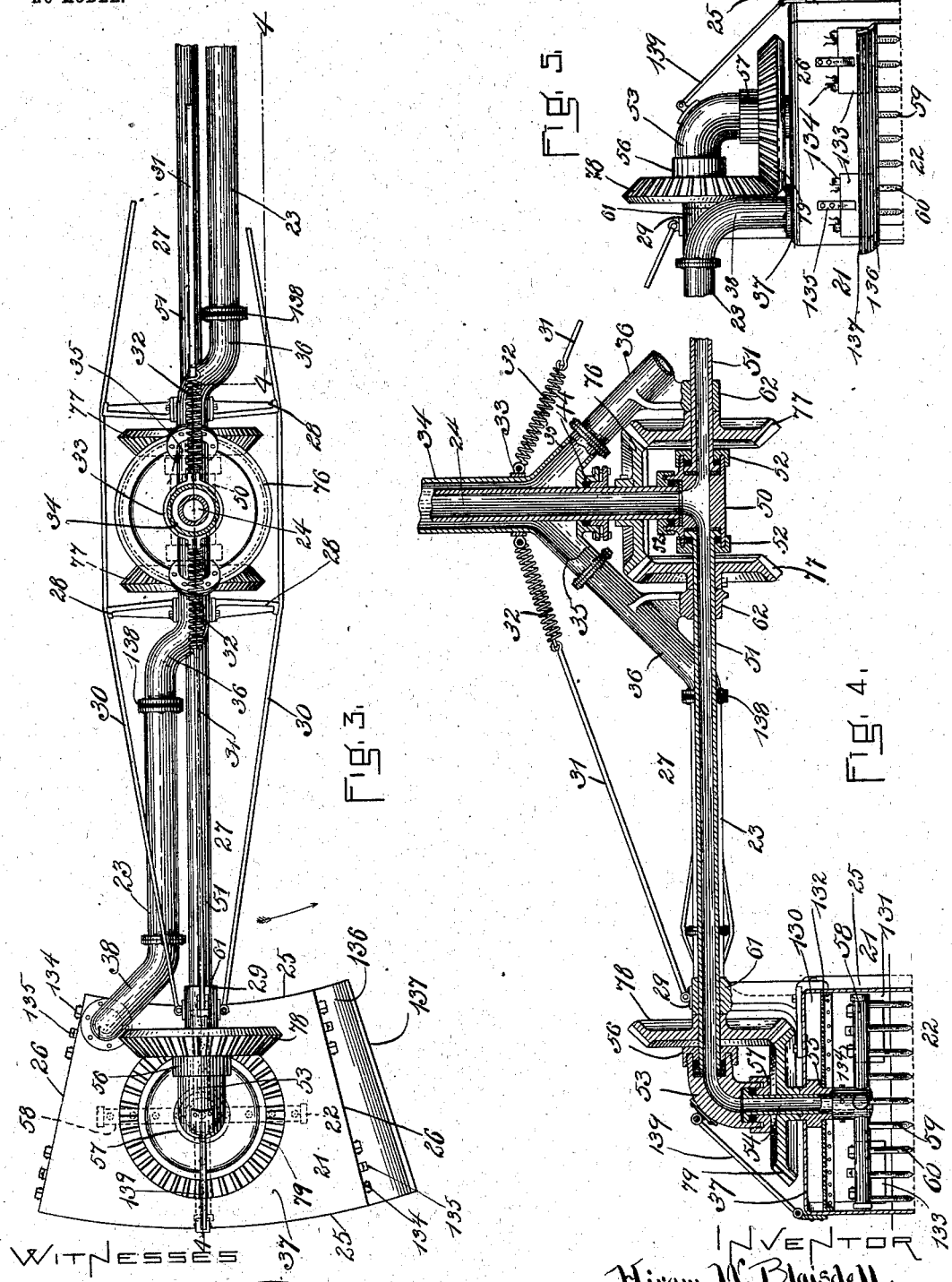

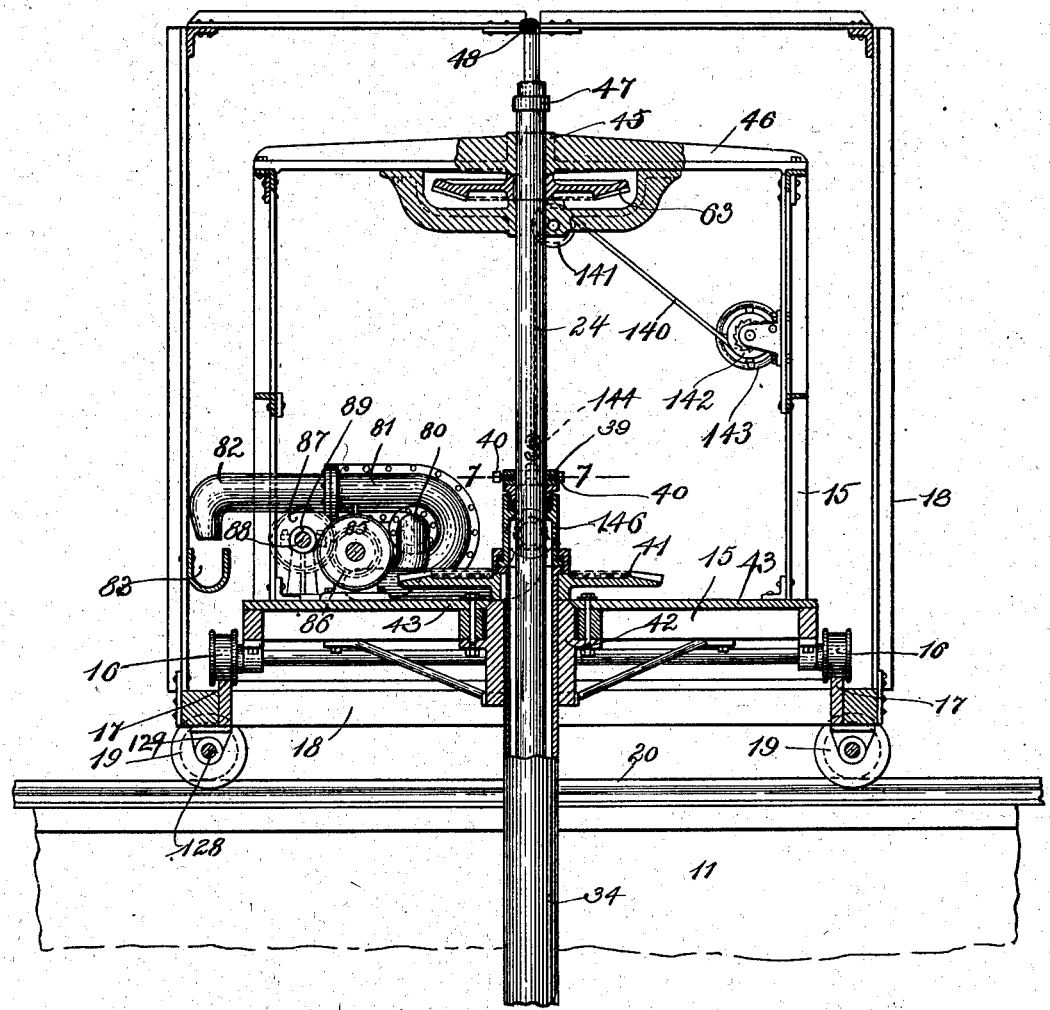

No. 729,720.

Patented June 2, 1903.

UNITED STATES PATENT OFFICE.

HIRAM W. BLAISDELL, OF YUMA, ARIZONA TERRITORY.

APPARATUS FOR CLEANING SAND FILTER-BEDS.

SPECIFICATION forming part of Letters Patent No. 729,720, dated June 2, 1903.

Application filed May 3, 1902. Serial No. 105,778. (No model.)

*To all whom it may concern:*

Be it known that I, HIRAM W. BLAISDELL, a citizen of the United States, residing at Yuma, in the county of Yuma and Territory of Arizona, have invented new and useful Improvements in Apparatus for Cleaning Sand Filter-Beds, (Case C,) of which the following is a specification.

This invention relates to an improved apparatus for cleansing the surface of the sand composing the bed of filters used in purifying the supply of water to cities and towns. These filters are of various kinds, but are usually laid out in a series of beds made of sand and inclosed by walls running longitudinally and transversely thereof. The water is introduced into the basin formed by the said walls and filters through the sand forming the filter-bed, thus leaving upon the surface of the sand the impurities previously contained in the water-supply. These impurities in time form a film or crust upon the upper surface of the sand, and the sand near the upper surface becomes covered with impurities, which interferes with the efficiency of the filter-bed, and it becomes necessary to remove this film or crust and to cleanse the sand upon the surface of the bed. As these filter-beds are of large area, to do this work of cleansing the surface without the aid of machinery or mechanical apparatus involves an enormous amount of labor and expense; and it is the object of this invention to provide an apparatus which will thoroughly remove the film or crust from the surface of the bed and also cleanse the sand upon the upper surface from the impurities hereinbefore set forth It is the further object of the invention to provide a strong, simple, and durable machine for the purpose hereinbefore set forth, and to provide a machine which shall be adapted to follow the inequalities of the surface of the filter-bed and to remove the impurities therefrom without removing the sand.

The invention consists, in apparatus for cleaning sand filter-beds, of a vertical rotatory suction-pipe, a carrier-frame fast thereto and arranged to rotate in a horizontal plane, a mixing-chamber supported upon said carrier-frame, a rotatory water-supply pipe inclosed within said suction-pipe, and pipes connecting said suction and water pipes to the interior of said mixing-chamber.

The invention again consists in the instrumentalities hereinbefore set forth in combination with a rake inclosed within said mixing-chamber.

The invention again consists in the particular means hereinafter set forth whereby a rotatory motion is imparted to the rake by operatively connecting said rake with said rotatory water-supply pipe.

The invention still further consists in the combination and arrangement of parts set forth in the following specification and particularly pointed out in the claims thereof.

Referring to the drawings, Figure 1 is a transverse section of a sand filter-bed with the inclosing walls and two complete sets of my improved apparatus for cleaning said sand filter-beds shown in elevation in connection therewith, both apparatus and filter-bed being broken away to save space in the drawings. Fig. 2 is a plan view of a portion of a filter-bed and of my improved apparatus for cleaning the same. Fig. 3 is an enlarged plan view of a portion of my improved apparatus for cleaning filter-beds. Fig. 4 is an enlarged sectional elevation taken on line 4 4 4 of Fig. 3. Fig. 5 is a front elevation of one of the mixing-chambers and the mechanism immediately connected therewith. Fig. 6 is an enlarged transverse section of the principal parts of my improved filter-bed-cleaning apparatus, taken on line 6 6 of Fig. 1 looking toward the right in said figure. Fig. 7 is a detail section taken on line 7 7 of Fig. 6.

Like numerals refer to like parts throughout the several views of the drawings.

In the drawings, 10 represents a sand filter-bed in transverse section, in which 11 12 are the side walls, 13 the sand composing the surface of the filter-bed, and 14 the water which is to be purified by filtration. The apparatus is directly supported upon a supplementary carriage 15, of which there are two in the form shown in Fig. 1. Each of said carriages 15 is provided with wheels 16, which run upon tracks 17. In the drawings I have illustrated two supplementary carriages with an apparatus constructed in accordance with my invention supported upon each of said supplementary carriages and both of said supplementary carriages arranged to travel lengthwise of a single main carriage 18. It is evident that several supplementary carriages and an apparatus for each supplementary carriage may be provided or that a single supplementary carriage and a single cleansing apparatus may be used, in each case said supplementary carriage traveling lengthwise of the main carriage and said main carriage traveling lengthwise of the filter-bed. The main carriage 18 is provided with wheels 19, which run upon tracks 20 20, provided upon the upper surface of the walls 11 12. It will be seen that the main carriage 18 moves lengthwise of the filter-bed upon the tracks 20, provided upon the walls 11 12, and that the supplementary carriage upon which my improved mechanism is directly supported moves crosswise of the filter-bed upon the tracks 17, which extend lengthwise of the main carriage but transversely of the filter-bed, and thus it will be seen that my improved apparatus may be moved lengthwise and transversely of the filter-bed, as desired.

It is essential in apparatus of the character described that the cleansing device should be capable of following the undulating surface of said bed without changing materially the relation of the working parts thereof, that it should be capable of being raised and lowered bodily, and, further, that the sand should not be removed from the bed, but should be cleansed by raking or stirring the surface of said sand and at the same time washing it and subsequently removing the impurities, leaving the sand upon the surface of the bed thoroughly cleansed. It is very essential that in the use of a suction-pipe the same should be so attached as to remove said impurities without sucking up the surface of the sand and making inequalties in the surface of the filter-bed. To attain these results, I provide, primarily, a mixing-chamber 21, which is provided with means whereby it may be raised and lowered upon the supplementary carriage 15 and also guided to preserve the same general relation to the surface of the sand filter-bed. In the interior of this mixing-chamber I provide a rake 22, either stationary or rotary, and above the rake and connected to the top of the mixing-chamber is provided a horizontal suction-pipe 23, which removes the impure water from said mixing-chamber, the water by which the cleansing of the sand is performed being introduced through another pipe 24. The mixing-chamber 21 is preferably closed at the top, as shown in Fig. 4; but a closed top is not absolutely essential. The mixing-chamber 21 is provided with curved side walls 25 25 and radial end walls 26 26. These four vertical walls inclose a certain area of the surface 13 and are supported upon a carrier-frame 27. Said carrier-frame consists of central cross-bars 28, two end cross-bars 29 29, connected to said central cross-bar by side bars 30 and by brace-rods 31, fast at their outer ends to said end cross-bars and at their inner ends by means of the springs 32 to a collar 33, said collar being in turn fastened to a Y connection 35, said Y connection being joined at its upper end to a vertical suction-pipe 34 and at its two lower ends by means of connecting-pipes 36 36 to the horizontal suction-pipes 23. The horizontal suction-pipes 23 are connected to the top 37 of the mixing-chamber 21 by an elbow 38. The vertical water-pipe 24 extends upward from the T connection 50, Fig. 1, and has a collar 39, fast to the upper end thereof by means of set-screws 40. The suction-pipe 34 is splined to a bevel-gear 41 and is arranged to slide vertically in a bearing 42, fast to the supplementary carriage-platform 43. The suction-pipe 34 is guided still further in its rotary and vertical movements by the vertical rotatory water-supply pipe 24, which is inclosed within said vertical suction-pipe 34, the lower end thereof extending downwardly through a stuffing-box 44, provided in the under side of the Y connection 35. The upper end of the water-supply pipe 24 is arranged to rotate and to slide in a bearing 45, provided upon a cross-frame 46, fast to the supplementary carriage 15. The upper end of said water-supply pipe 24 is connected by a swivel-joint or union 47 to a flexible pipe 48, said flexible pipe 48 being in turn connected to a pump 49, driven as hereinafter described.

The lower end of the water-pipe 24 is joined by a connection 50 to horizontal water-supply pipes 51 51. Each of the said horizontal supply-pipes and said vertical supply-pipe are supplied with stuffing-boxes 52 to form a water-tight joint with said connection 50. The horizontal water-supply pipes 51 are each joined at their outer ends by a connecting-elbow 53 to the upper end of a vertical pipe 54, fast to the hub 55 of the rake 22. The stuffing-box 56 forms a tight joint between the connection 53 and the horizontal water-supply pipe 51, and another stuffing-box 57 forms a water-tight joint between the connection 53 and the vertical pipe 54.

The rake 22 is formed of pipe 58, said pipe forming four arms, each arm having projecting downwardly therefrom hollow teeth 59 and each of said teeth being provided with discharge-outlets 60. The teeth of the rake 22 project below the surface of the sand 13, and the water descending through the vertical supply-pipe 24 passes through the horizontal supply-pipes 51, elbow 53, vertical pipe 54, and through the arms of the rake 58 downwardly into the hollow teeth 59 and outwardly through the discharge-outlets 60 below the surface of the sand, thence rising above said surface into the mixing-chamber 21. The pipes 51 are arranged to rotate in bearings 61, formed in the end cross-bars 29, said end cross-bars projecting downwardly, Fig. 4, and having the mixing-chambers 21 rigidly fastened thereto by screws or bolts.

The horizontal water-supply pipes 51 are also provided with bearings 62, fast to the connection-pipes 36.

The water-supply pipe 24 is splined at its upper end to a bevel-gear 63, said bevel-gear being arranged to rotate in a bearing upon the cross-frame 46 and meshing into a bevel-gear 64, fast to a shaft 65, arranged to rotate in bearings 66, and having a sprocket-gear 67 fast thereto and connected by a sprocket-chain 68 to another sprocket-gear 69, fast to a shaft 70, which rotates in bearings 71, fast to the platform of the supplementary carriage 15, and has a gear 72 fast thereto, which meshes into a pinion 73, fast to the driving-shaft 74 of the electric motor 75.

It is evident that when power is supplied to the electric motor 75 the water-pipe 24 will be rotated through the pinion 73, gear 72, sprocket-gears 69 and 67, and bevel-gears 64 and 63. The rotary motion thus imparted to the water-supply pipe 24 is communicated to the rake 22 by means of the bevel-gears 76 and 77, fast, respectively, to said water-pipe 24 and to the horizontal water-pipes 51, and by the bevel-gears 78 and 79, fast, respectively, to the horizontal water-pipe 51 and the vertical water-pipe 54, said vertical water-pipe 54 forming, in effect, an extension of the hub 55 of the rotatory rake 22.

The upper end of the suction-pipe 34 is connected by a T connection 146 and flexible pipe 80 to a centrifugal suction-pump 81, provided with an outlet-pipe 82, which empties into a trough 83, rigidly fastened to the main carriage 18 and emptying into a channel 84, provided in the upper surface of the wall 12. The channel 84 empties into any desirable outlet or sewer pipe. The force-pump 49, by which water is supplied to the water-supply pipe 24, and the centrifugal suction-pump 81, by which the water is drawn through the suction-pipe 34 from the mixing-chamber 21, are both driven by an electric motor 85. Said motor is provided with a gear 86, fast to the driving-shaft thereof and meshing into a gear 87, fast to a shaft 88, arranged to rotate in bearings 89, fast to the platform 43 of the supplementary carriage 15. The shaft 88 has a sprocket-gear 90, fast thereto and connected by a sprocket-chain 91 to a sprocket-gear 92, said sprocket-gear 92 being fast to the driving-shaft of the suction-pump 81. The force-pump 49 is in like manner driven from the shaft 88 by a spur-gear 93, fast to said shaft and meshing into a gear 95, fast to the shaft 96 and connected by gears 97 and 98 with the main driving-shaft 99 of said pump. The water supplied to the pipe 24 may be taken from any desirable source of supply; but preferably it is taken from the surface water upon the filter-bed by means of a pipe 100, Fig. 1, connected with the pump 49.

The suction-pipe 34 is rotated by means of the bevel-gear 41, said bevel-gear being rotated in turn by a bevel-gear 101, fast to the shaft 70. The suction-pipe 34, carrier-frame 27, mixing-chamber 21, rake 22, water-supply pipes 24 and 51, and all of the parts supported upon the carrier-frame 27 are raised and lowered by means of chains or wire ropes 140, which pass over pulleys 141 and are operated by means of a windlass 142 and hand-wheel 143, all supported upon the supplementary carriage 15. The ropes 140 are connected by hooks 144 to ears 145 upon the collar 39, said collar being fastened by set-screws 40 to the water-pipe 24.

The supplementary carriage 15 is propelled transversely of the filter-beds and lengthwise of the main carriage 18 by the electric motor 75, which rotates the shaft 70 through the pinion 73 and gear 72. Said shaft 70 has fast thereto a bevel-gear 102, which meshes into two bevel-gears 103 104, which turn loosely upon the shaft 105, said shaft arranged to rotate in bearings 106 upon the supplementary carriage 15. The gears 103 and 104 are alternately connected to and disconnected from the shaft 105 by means of the clutch 107, operated by a lever 108. The shaft 105 has a sprocket-gear 109 fast thereto and connected by a sprocket-chain 110 to a sprocket-gear 111, fast to a shaft 112, extending transversely of the supplementary carriage 15 and having fastened at each end thereof one of the wheels 16. The apparatus by means of which the main carriage is propelled lengthwise of the filter-bed is similar to that by which the supplementary carriage is propelled lengthwise of said main carriage 18 and consists of an electric motor 113, supported upon said main carriage and having a gear 114 fast to the driving-shaft thereof, which meshes into a gear 115, fast to a shaft 116, arranged to rotate in bearings 117, supported upon the main carriage 18. The shaft 116 has fast thereto a bevel-gear 118, which meshes into two bevel-gears 119 and 120, arranged to turn loosely upon a shaft 121 and connected to and disconnected from said shaft, as may be desired, by means of a clutch 122, operated by a lever 123. The shaft 121 rotates in bearings 124, supported upon the main carriage 15 and has fast thereto a sprocket-gear 125, which is connected by a sprocket-chain 126 to a sprocket-gear 127, fast to a shaft 128, extending lengthwise of the carriage 18 and having fast at each end thereof a wheel 19, the shaft 128 arranged to rotate in bearings 129, fast to the main carriage 18.

The mixing-chamber 21 is divided into an upper compartment 130 and a lower compartment 131 by a horizontal perforated partition 132, said partition being provided for the purpose of separating the sand which enters the interior of said mixing-chamber from the water which passes up through said perforated partition and is drawn upwardly by the centrifugal suction-pump 82, as hereinbefore described. In order that the surface of the water in the interior of the mixing-chamber 21 and upon the filter-bed 10 may stand at substantially the same level, I provide valves 133 in the walls 26 26 of each of the mixing-chambers 21. Said valves are pivoted at 134 to the walls 26 of the mixing-chamber and are normally held in a vertical position by flat springs 135. If the level of the water in the interior of the mixing-chamber becomes lower than that outside said mixing-chamber, the valve will open inwardly and allow water to enter said mixing-chamber from the surface of the filter-bed, and vice versa.

In order to guide the mixing-chamber over the undulating sand surface of the filter-bed, a guide-plate 136 is provided upon the advancing side of each of the mixing-chambers 21, said guide-plate being turned upwardly along its front edge at 137 in order that it may more easily glide over any inequalities in the sand surface of the filter-bed. In order that the mixing-chamber may still further be provided with means whereby it may rise and fall to accommodate itself to the varying contour of the surface of the filter-bed, I support said mixing-chamber from the collar 33 by means of the braces 31, joined to said collar 33 by springs 32, which yield and allow said mixing-chamber to rise and fall for the purpose set forth. An elastic washer or packing 138 is also provided between the suction-pipe 23 and connection-pipes 36 in order to allow the mixing-chamber 21 to rise and fall to a limited extent, as hereinbefore described, said elastic washer 138 forming a yielding connection at the point where the suction-pipes 23 and connecting-pipes 36 are connected together. The mixing-chamber 21 is firmly supported, as hereinbefore set forth, from the end cross-bar 29, being securely fastened thereto by screws or rivets, and the elbow 53 is securely fastened to the mixing-chamber 21 by means of the stay-rod 139, Fig. 4.

The general operation of the apparatus hereinbefore described is as follows: Assuming the mixing-chamber and the parts connected thereto to have been lowered to the surface of the filter-bed, as shown in Fig. 1, and each of the two cleaning apparatuses to be located in opposite corners of the filter-bed at the same end of said filter-bed, the motor 75 is started, thus rotating the rake inclosed within the mixing-chamber by means of the gears 73 and 72, sprocket-gears 69 and 67, and bevel-gears 64 63, said bevel-gear 63 being splined to the vertical water-supply pipe 24 and imparting motion to the rake 22 through the bevel-gears 76, 77, 78, and 79. The carrier-frame 27 is simultaneously rotated by means of the gears 101 and 41, said gear 41 being splined to the suction-pipe 34. As soon as the rake and carrier-frame, together with the mixing-chamber, have thus been started upon their rotary movements the supplementary carriage is moved lengthwise of the main carriage 18 by throwing the clutch 107 into engagement with one of the gears 103 104 by means of the lever 108, and when the supplementary carriage has traveled a sufficient extent to meet the second supplementary carriage the clutch 107 upon each of the supplementary carriages is thrown out of gear. The main carriage 18 is then moved lengthwise of the filter-bed by means of the electric motor 113, which is thrown into action to rotate the shaft 128 by means of the clutch 122, said clutch being thrown into engagement with one of the gears 119 120 by means of the lever 123, thus rotating the sprocket-gears 125 and 127 and rotating the shaft 128, thus moving the main carriage 18 lengthwise of the filter-bed the desired distance. The motor 113 is then thrown out of engagement with the shaft 128, the main carriage 18 comes to a standstill, and the supplementary carriages, together with the cleaning apparatus attached to each, are propelled transversely of the filter-bed and lengthwise of the main carriage 18 by the mechanism hereinbefore described.

During the operations hereinbefore described the water from the surface of the filter-bed is carried through the pipe 100 by the pump 49, said pump being driven by the electric motor 85 through the gearing 86 87, and sprocket-gears 93 and 95, and said water is then forced by said pump through the flexible pipe 48, water-supply pipe 24, horizontal supply-pipes 51, elbow 53, and vertical pipe 54 to the pipes 58 and hollow teeth 59 of the rake 22, issuing from said hollow teeth through the discharge-outlets 60, passing upwardly through the surface of the sand into the lower compartment 131 of the mixing-chamber 21, thence passing through the perforated partition 132 into the upper compartment 130, carrying therewith the impurities from the surface of the sand, whence said water, together with the impurities carried thereby, is carried through the elbow 38, suction-pipe 23, connecting-pipe 36, vertical suction-pipe 34, and flexible pipe 80 to the centrifugal pump 81, thence passing by means of the outlet-pipe 82 into the trough 83 and from the trough 83 into the channel 84, said water, with the impurities, passing from the channel 84 to any desirable outlet.

If the two sets of cleaning apparatus illustrated in Fig. 1 cover the total width of the filter-bed, it is evident that the transverse movement of the supplementary carriages with relation to the filter-bed will be unnecessary. The lengthwise and transverse movements of the two carriages hereinbefore described are repeated until the whole surface has been traversed by the mixing-chambers, and during these transverse and longitudinal movements of the mixing-chambers the rakes have been kept constantly in rotation, and both rakes and mixing-chambers have been revolved by the mechanism hereinbefore described. It will be seen that the rake is rotated about its own axial center and at the same time is revolved about the axial center of the suction-pipe 34 by means of the carrier-frame, upon which it is supported.

The construction and operation of the mixing-chamber 21 and of the rotary rake inclosed therein are substantially the same in the machine of this invention as that shown and described in two other applications made by me entitled, respectively, "Apparatus for cleaning sand filter-beds," Serial No. 105,776, filed May 3, 1902, and "Apparatus for cleaning sand filter-beds," Serial No. 105,777, filed May 3, 1902; but in said application Serial No. 105,776 the mixing-chamber and rake are carried directly upon the supplementary carriage without having a revolving motion imparted thereto, and in said application Serial No. 105,777 the rake is rotated by a motor supported directly upon the carrier-frame and the water is pumped from the surface of the filter-bed into the mixing-chamber by the same motor, whereas in the present application the mechanism by which the rake is rotated is supported directly upon the supplementary carriage and also the pump, by which water is forced from the surface of the filter-bed into the mixing-chamber. The mechanism for rotating the rake and the rotation of the vertical water-supply pipe, said vertical water-supply pipe being surrounded by the suction-pipe, also constitute novel features in this application as compared with said applications Serial Nos. 105,776 and 105,777.

Having thus described my invention, what I claim, and desire by Letters Patent to secure, is—

1. In an apparatus for cleaning filter-beds, a vertical rotatory suction-pipe, a carrier-frame fast thereto and arranged to rotate in a horizontal plane, a mixing-chamber supported upon said carrier-frame, a rotatory water-supply pipe inclosed within said suction-pipe, and pipes connecting said suction and water pipes to the interior of said mixing-chamber.

2. In an apparatus for cleaning filter-beds, a vertical rotatory suction-pipe, a carrier-frame fast thereto and arranged to rotate in a horizontal plane, a mixing-chamber supported upon said carrier-frame, a rake inclosed within said mixing-chamber, a rotatory water-supply pipe inclosed within said suction-pipe, and pipes connecting said suction and water pipes to the interior of said mixing-chamber.

3. In an apparatus for cleaning filter-beds, a vertical rotatory suction-pipe, a carrier-frame fast thereto and arranged to rotate in a horizontal plane, a rotatory rake supported upon said carrier-frame, a rotatory water-supply pipe inclosed within said suction-pipe, a horizontal water-supply pipe arranged to rotate in bearings upon said carrier-frame, and gearing operatively connecting said rake and water-pipes together.

4. In an apparatus for cleaning filter-beds, a vertical rotatory suction-pipe, a carrier-frame fast thereto and arranged to rotate in a horizontal plane, a mixing-chamber supported upon said carrier-frame, a rotatory rake inclosed within said mixing-chamber, a vertical rotatory water-supply pipe inclosed within said suction-pipe, a horizontal water-supply pipe arranged to rotate in bearings upon said carrier-frame, and gearing operatively connecting said rake and water-pipes together.

5. In an apparatus for cleaning filter-beds, a vertical rotatory suction-pipe, a carrier-frame fast thereto and arranged to rotate in a horizontal plane, a rotatory rake formed of pipe supported upon said carrier-frame, a vertical rotatory water-supply pipe inclosed within said suction-pipe, a horizontal water-supply pipe arranged to rotate in bearings upon said carrier-frame, pipe connections between said water-supply pipes and said rake, and gearing operatively connecting said rake and water-pipes together.

6. In an apparatus for cleaning filter-beds, a vertical rotatory suction-pipe, a carrier-frame fast thereto and arranged to rotate in a horizontal plane, a rotatory rake formed of pipe supported upon said carrier-frame, a vertical rotatory water-supply pipe inclosed within said suction-pipe, a horizontal water-supply pipe arranged to rotate in bearings upon said carrier-frame, pipe connections between said water-supply pipes and said rake, gearing operatively connecting said rake and water-pipes together, and a pipe connecting said suction-pipe to the interior of said mixing-chamber.

7. In an apparatus for cleaning filter-beds, a carriage arranged to travel over the surface of said beds, a vertical rotatory suction-pipe, a suction-pump operatively connected to said pipe, and mechanism to rotate said pipe, all supported upon said carriage; a water-supply pipe inclosed within said suction-pipe, and mechanism upon said carriage to rotate said water-supply pipe.

8. In an apparatus for cleaning filter-beds, a carriage arranged to travel over the surface of said beds, a vertical rotatory suction-pipe, a carrier-frame fast to said suction-pipe, a mixing-chamber supported upon said carrier-frame, and a pipe connecting said suction-pipe to the interior of said mixing-chamber.

9. In an apparatus for cleaning filter-beds, a carriage arranged to travel over the surface of said beds, a vertical rotatory suction-pipe, a carrier-frame fast to said suction-pipe, a mixing-chamber supported upon said carrier-frame, a pipe connecting said suction-pipe to the interior of said mixing-chamber, a rotatory rake formed of pipe inclosed within said mixing-chamber, a vertical rotatory water-supply pipe inclosed within said suction-pipe, a horizontal water-supply pipe arranged to rotate in bearings upon said carrier-frame, pipe connections between said water-supply pipes and said rake, and gearing operatively connecting said rake and water-pipes together.

10. In an apparatus for cleaning filter-beds, a carriage arranged to travel over the surface of said beds, a vertical rotatory suction-pipe, a carrier-frame fast thereto and arranged to rotate in a horizontal plane, a mixing-chamber supported upon said carrier-frame, a horizontal suction-pipe connecting said mixing-chamber and vertical suction-pipe, a rake formed of pipe surrounded by said mixing-chamber, and a pump located upon said carriage and operatively connected to pump water from the surface of said filter-bed to said rake.

11. In an apparatus for cleaning filter-beds, a carriage arranged to travel over the surface of said beds, a vertical rotatory suction-pipe, a carrier-frame fast thereto and arranged to rotate in a horizontal plane, a mixing-chamber supported upon said carrier-frame, a rake inclosed within said mixing-chamber, a rotatory water-supply pipe inclosed within said suction-pipe, and pipes connecting said suction and water pipes to the interior of said mixing-chamber.

12. In an apparatus for cleaning filter-beds, a carriage arranged to travel over the surface of said beds, a vertical rotatory suction-pipe, a carrier-frame fast thereto and arranged to rotate in a horizontal plane, a mixing-chamber supported upon said carrier-frame, a rake inclosed within said mixing-chamber, a rotatory water-supply pipe inclosed within said suction-pipe, pipes connecting said suction and water pipes to the interior of said mixing-chamber, and a force-pump operatively connected to said vertical water-supply pipe.

13. In an apparatus for cleaning filter-beds, a carriage arranged to travel over the surface of said beds, a vertical rotatory suction-pipe, a carrier-frame fast thereto and arranged to rotate in a horizontal plane, a mixing-chamber supported upon said carrier-frame, a rake inclosed within said mixing-chamber, a rotatory water-supply pipe inclosed within said suction-pipe, pipes connecting said suction and water pipes to the interior of said mixing-chamber, a force-pump operatively connected to said vertical water-supply pipe, and a suction-pump connected to said vertical suction-pipe.

In testimony whereof I have hereunto set my hand in presence of two subscribing witnesses.

HIRAM W. BLAISDELL.

Witnesses:
CHARLES S. GOODING,
ANNIE J. DAILEY.